United States Patent
Bechhoefer

(10) Patent No.: US 11,486,483 B1
(45) Date of Patent: Nov. 1, 2022

(54) CONDITION MONITORING FOR COMPONENTS OF A GEARBOX

(71) Applicant: GPMS International, Inc., Cornwall, VT (US)

(72) Inventor: Eric R. Bechhoefer, Cornwall, VT (US)

(73) Assignee: GPMS International, Inc., Cornwall, VT (US)

( * ) Notice: Subject to any disclaimer, the term of this patent is extended or adjusted under 35 U.S.C. 154(b) by 358 days.

(21) Appl. No.: 16/946,818

(22) Filed: Jul. 8, 2020

Related U.S. Application Data

(60) Provisional application No. 62/871,390, filed on Jul. 8, 2019.

(51) Int. Cl.
| | |
|---|---|
| *F16H 57/01* | (2012.01) |
| *F16H 59/38* | (2006.01) |
| *G01M 15/12* | (2006.01) |
| *G01M 13/02* | (2019.01) |

(52) U.S. Cl.
CPC ............. *F16H 57/01* (2013.01); *F16H 59/38* (2013.01); *G01M 13/02* (2013.01); *G01M 15/12* (2013.01); *F16H 2057/012* (2013.01)

(58) Field of Classification Search
CPC .. F16H 57/01; F16H 2057/012; G01M 13/02; G01M 15/12
See application file for complete search history.

(56) References Cited

U.S. PATENT DOCUMENTS

| | | | | |
|---|---|---|---|---|
| 9,797,808 | B2* | 10/2017 | Potts | G01M 13/028 |
| 10,168,248 | B1* | 1/2019 | Morey | G01M 13/045 |
| 10,197,594 | B2 | 2/2019 | Bechhoefer | |
| 11,048,774 | B1* | 6/2021 | Bechhoefer | G01M 13/00 |
| 2009/0216398 | A1* | 8/2009 | Lynch | G01M 7/025 |
| | | | | 701/29.5 |
| 2010/0256932 | A1* | 10/2010 | Kar | G01M 13/021 |
| | | | | 702/56 |

(Continued)

OTHER PUBLICATIONS

Bechhoefer, et al., "A Review of Time Synchronous Average Algorithms", Annual Conference of the Prognostics and Health Management Society, 2009.

(Continued)

*Primary Examiner* — Eric S. McCall
(74) *Attorney, Agent, or Firm* — STGIP, LLC; Shawn Gordon

(57) ABSTRACT

Conditioning monitoring is provided for rotating components in gearboxes that accounts for gear system dynamics, allowing for improved analysis. A rotation rate for the component is generated from vibration data by estimating the rotation rate based on a tachometer measurement of another shaft and the shaft ratio. This estimated rotation rate is used, together with the known configuration of the component, to estimate a known gear mesh frequency of the component. By filtering for a range of frequencies around the gear mesh frequency based on variation in the shaft rate, the gear mesh frequency can be determined and from that signal, an actual rotation rate for the component can be determined. The actual or determined rotation rate can then be used in deriving an analytic vibration spectrum for the component that is not degraded due to gear system dynamics effects.

17 Claims, 18 Drawing Sheets

(56) References Cited

U.S. PATENT DOCUMENTS

| | | | |
|---|---|---|---|
| 2015/0369699 A1* | 12/2015 | Chen | G01M 13/028 |
| | | | 73/593 |
| 2017/0363072 A1* | 12/2017 | Son | G01M 7/00 |
| 2018/0059135 A1* | 3/2018 | Bechhoefer | G01P 21/02 |
| 2019/0195192 A1* | 6/2019 | Takahashi | G01M 99/00 |
| 2021/0239098 A1* | 8/2021 | Ramakrishnan | G01M 13/02 |
| 2022/0082090 A1* | 3/2022 | Kumar | G05B 17/02 |

OTHER PUBLICATIONS

Mark, "The Transfer Function Method for Gear System Dynamics Applied to Conventional and Minimum Excitation Gearing Designs", NASA Contractor Report, 3626, Oct. 1982.

Scagliarini, et al., "Spur Gear Vibration Mitigation by Means of Energy Pumping", Dec. 2008.

UK Civil Aviation Authority, "Airworthiness Directives", available at https://www.caa.co.uk/Commercial-Industry/Aircraft/Airworthiness/Continuing-airworthiness/Airworthiness-Directives/, last viewed Sep. 13, 2019, Dec. 20, 2015.

UK Civil Aviation Authority, "Helicopter Vibration Health Monitoring (VHM)", available at: http://publicapps.caa.co.uk/docs/33/CAP%20753%20Helicopter%20Vibration%20Health%20Monitoring%20v2%20Feb18%20FINAL.pdf, last viewed Sep. 13, 2019, Feb. 2018.

* cited by examiner

CONDITION MONITORING FOR COMPONENTS OF A GEARBOX

FIELD OF THE INVENTION

The present invention generally relates to monitoring the condition of machine components. In particular, the present invention is directed to condition monitoring for components of a gearbox.

BACKGROUND

Condition monitoring of components in machines is a technique in which a measure of the health of components can be determined using sensors. Condition monitoring improves asset reliability and allows for improved availability of the asset by allowing for opportunistic maintenance—in other words, performing maintenance on components of the assets prior to failure, but with an understanding that the component is non-compliant or becoming non-compliant. In addition, condition monitoring has been successful in improving asset safety.

For gearboxes, condition monitoring typically involves the use of accelerometers to measure vibrational energies associated with rotating components within the gearbox. The condition monitoring system performs analyses on the accelerometer data to extract features which are indicative of component damage and fatigue. Vibration health monitoring systems may monitor different aspects of main gearbox components, such as gears, shafts, and bearings, in which the aspects may include: shaft order 1 (a first harmonic of the shaft under analysis), shaft order 2 (a second harmonic of the shaft under analysis), and gear mesh frequencies, which may be used to ascertain gear tooth indicators, bearing wear indicators, and modulation of web tone epicyclic gear indictors.

The monitoring of gears and shafts is typically based on analyses that use the Time Synchronous Average (TSA) of measured vibrational signals. Time synchronous averaging is a method for reducing noise in spectra of complex signals as well as for extracting more information from the signals. The TSA signal (an example of which is shown in FIG. 1A) may be used in many analyses, including Residual/Different analysis (FIG. 1B), the Energy Operator (FIG. 1C), FTT (FIG. 1D), the Narrow Band Analysis (FIG. 1E), the Amplitude Modulation Analysis (FIG. 1E), and the Frequency Modulation Analysis (FIG. 1G). While these analyses have been useful, they do not account for gear system dynamics.

SUMMARY OF THE DISCLOSURE

A system for monitoring a rotating component in a gearbox includes a tachometer positioned to measure a rotation rate for a shaft of the gearbox and a sensor positioned to detect vibration signals emitted by the rotating component, wherein there is a shaft ratio from the shaft to the rotating component. A microcontroller is in electronic communication with the sensor and the tachometer, the microcontroller including a processor and a non-transitory memory, and is configured to execute a set of instructions for generating a time synchronous average vibration signal (TSA) for the rotating component that is corrected for gear system dynamics of the gearbox by receiving vibration signal data from the sensor, wherein the vibration signal data includes data for the vibration signals emitted by the rotating component, receiving rotation rate data for the shaft from the tachometer, determining an expected rotation rate of the monitored component based on the rotation rate data for the shaft and the shaft ratio, determining an expected gear mesh frequency for the rotating component based on the expected rotation rate and a configuration of the rotating component, determining a variation in the rotation rate of the shaft and a variation in the expected rotation rate, generating a range of frequencies encompassing the expected gear mesh frequency based on the variation in the rotation rate of the shaft, applying a bandpass filter to the vibration signal data to isolate the range of frequencies, deriving, from the filtered vibration signal data, an analytical signal representing a determined gear mesh frequency, and determining a derived rotation rate of the monitored rotating component based on the analytical signal.

A method for monitoring a rotating component in a gearbox includes receiving vibration signal data from a sensor, wherein the sensor is positioned to detect vibration signals emitted by the rotating component in the gearbox and wherein the vibration signal data includes vibration signals emitted by the rotating component. Rotation rate data is received for a shaft of the gearbox from a tachometer positioned to measure a rotation rate for the shaft, wherein there is a shaft ratio between the shaft and the rotating component. An expected rotation rate of the rotating component is determined based on the rotation rate data for the shaft and the shaft ratio. An expected gear mesh frequency for the rotating component is determined based on the expected rotation rate and a configuration of the rotating component. A variation in the rotation rate of the shaft and a variation in the expected rotation rate is determined and a range of frequencies encompassing the expected gear mesh frequency is generated based on the variation in the rotation rate of the shaft. A bandpass filter is applied to the vibration signal data to isolate the range of frequencies and an analytical signal representing a determined gear mesh frequency is derived from the filtered vibration signal data. A derived rotation rate of the rotating component is then determined based on the analytical signal.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1A:
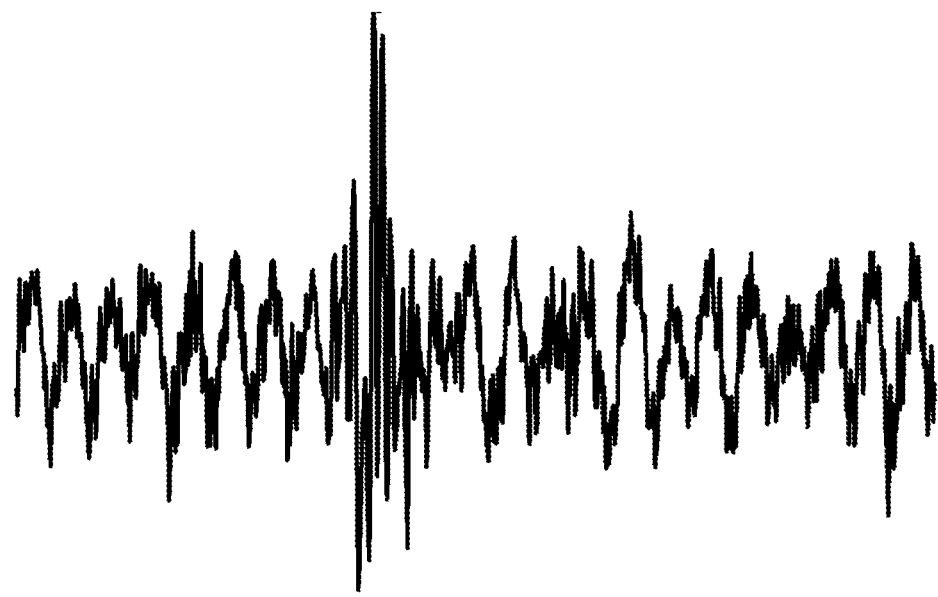
FIGS. 1A-1G are a series of graphs showing prior art techniques for analyzing measured vibration signals of gears and shafts.

Condition monitoring based on vibration measurements depends in part on the rotation rate of the monitored component. The rotation rate of any component is a function of the measured shaft rate (determined by a tachometer) and the shaft ratio to the component of interest. That is, if the shaft under analysis is not the shaft with the tachometer, it is possible to interpolate the zero cross time of the shaft under analysis by using the shaft ratio from the shaft with the tachometer to the shaft under analysis. However, this relationship does not result in a precise prediction of the rotation rate of the component (e.g., a gear on a shaft for which direct tachometer measurements are not made) of interest if the component of interest is displaced physically apart (in terms of gear dynamics) from the shaft that the tachometer is measuring. In other words, the actual rotation rate can be very different (in the context of performing signal analysis on vibration measurements) than would be expected from simply applying the shaft ratio. This variation in actual versus predicted rotation rate due to the global effect of gear system dynamics is deleterious to an analysis of a time synchronous averaged vibration spectrum used for condition monitoring. That is, if the tachometer is not mounted near the component (shaft or gear) under analysis, the analysis is degraded.

An improved conditioning monitoring technique is provided for gearboxes that accounts for gear system dynamics by determining the actual rotation rate for a component of interest from vibration data. The determined rotation rate is in this way corrected for gear system dynamics and allows for improved signal analysis of the component of interest so that faults or defects can be detected earlier and/or more accurately. The analytic signal is developed using an ideal filter in a single functional process and noise is removed. This results in an improved TSA signal for rotating components in gearboxes, and TSA signals are fundamental to gear fault diagnostics using vibration-based analysis.

In general, gear analyses are used to extract features that are indicative of gear faults. Gears may exhibit a number of nonconformities or failure modes, such as: Scoring/Frosting, Wear (adhesive, abrasive, corrosive), Pitting (flaking, spalling), Plastic Flow (Ridging/Rippling), and tooth breakage. (A nonconformity is a component feature that causes the rotating component to emit signals that are different from or in addition to signals that are emitted by the rotating component when the rotating component is functioning normally.) As such, no single analysis is used to find all these fault features and there are a number of analyses that can be performed. For example, the residual, or differential, signal may be used. The residual signal for gear analysis is a synchronous averaged signal without the gear mesh frequency, the gear mesh frequency harmonics, the driveshaft frequency, and the driveshaft frequency second harmonics.

Figure 1B:
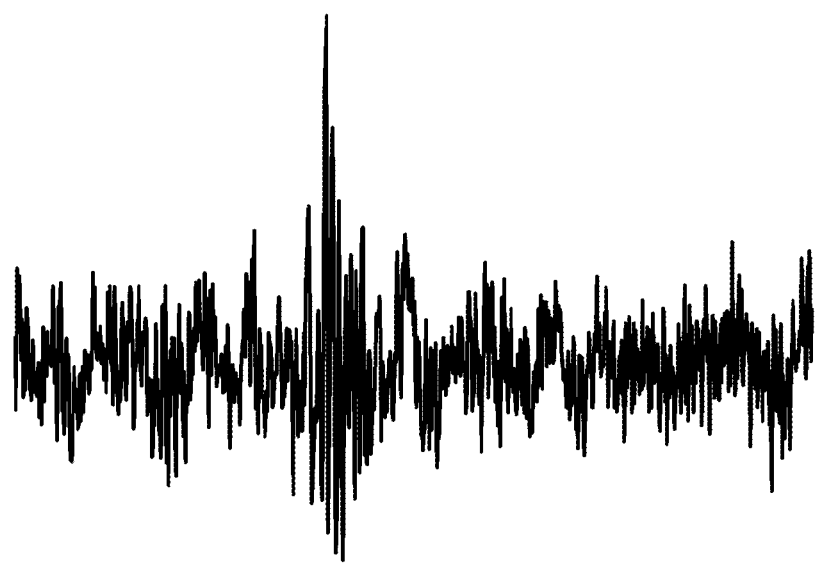
Figure 1C:
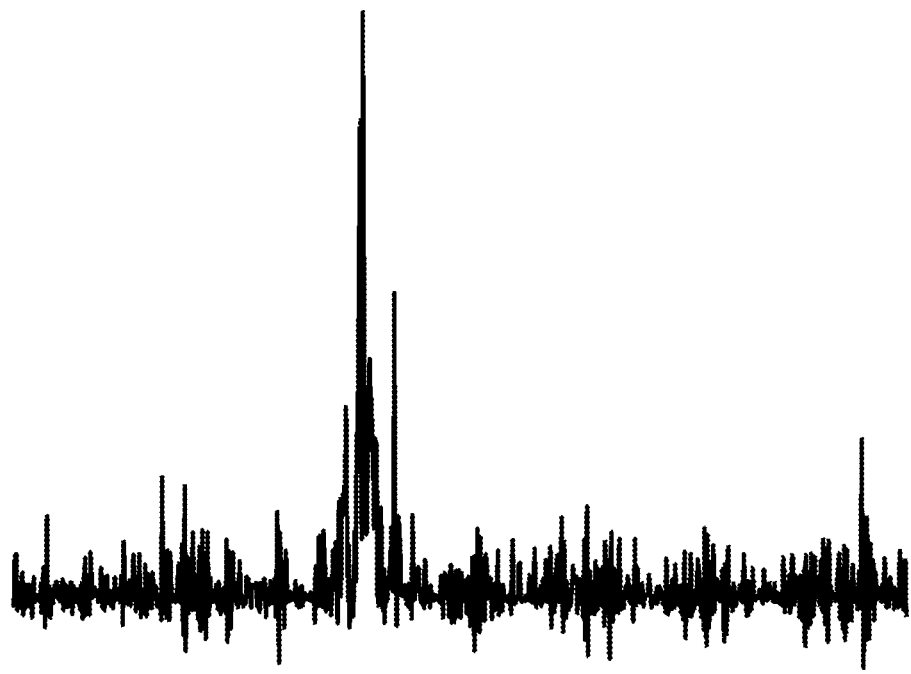
Figure 1D:
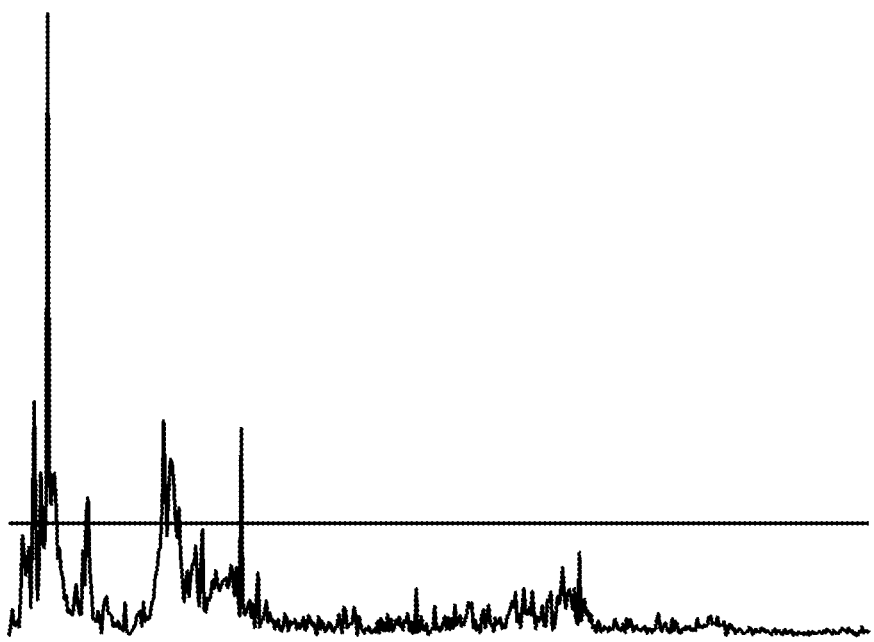
Figure 1E:
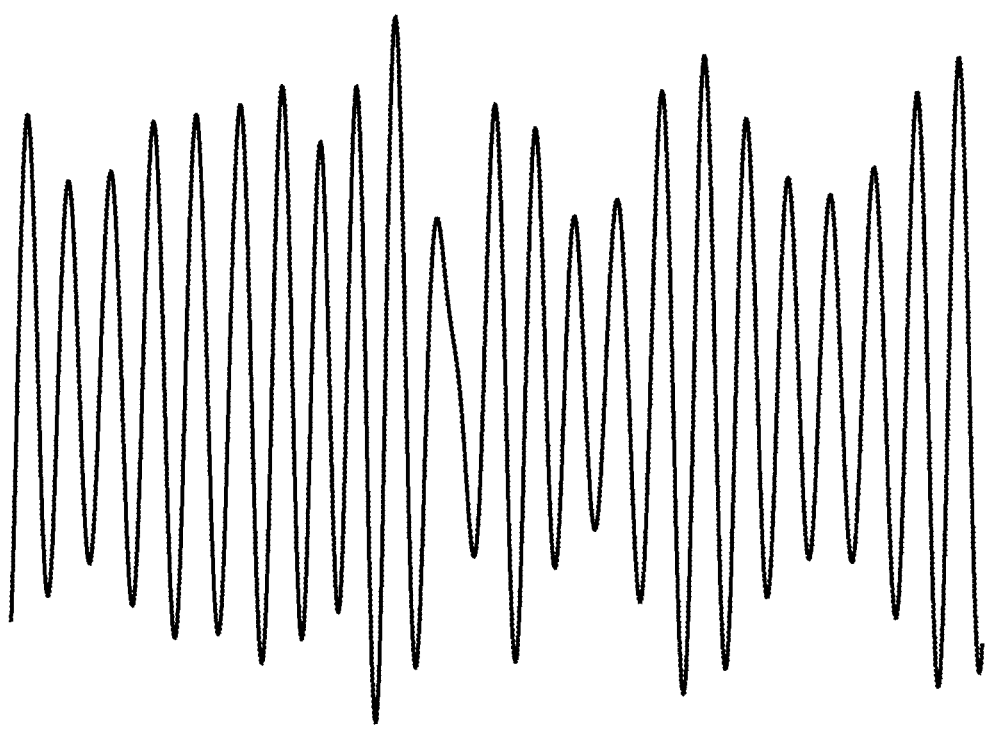
Figure 1F:
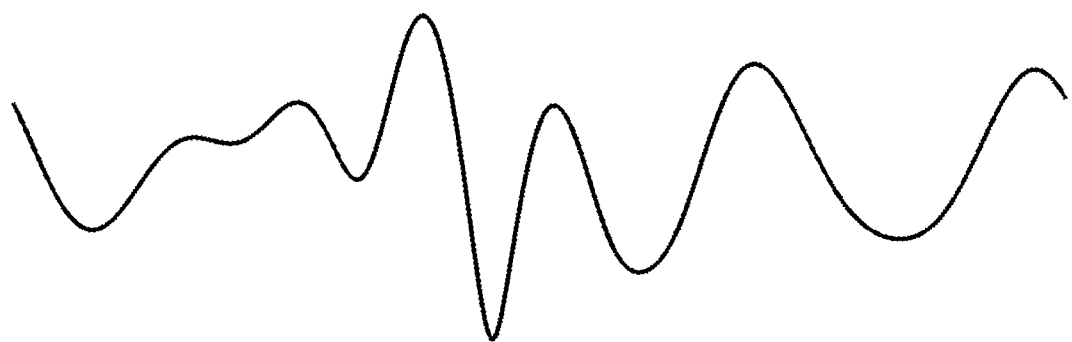
Figure 1G:
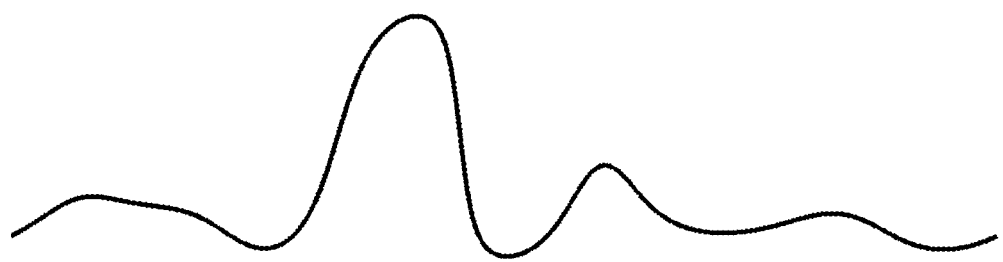

When the first order sidebands about the gear mesh frequencies are filtered out, a residual signal is created. (Sidebands in this context are the result of frequency or amplitude modulation. In a spectrum, sidebands appear as spectral components symmetrically spaced on both sides of the carrier frequency.) Conceptually, a TSA of this residual signal will reveal a periodic signal associated with a component fault, such as a soft or cracked tooth in a gear. The signal from the fault feature is not sinusoidal and is not associated with 1/Rev or gear mesh frequency, which are removed in the residual signal, thus leaving the "impact" as is clearly seen in the residual signal examples in FIG. 1B (Prior Art).

A classical residual signal is a signal from which the gear mesh and sidebands are removed, and a threshold residual signal is the signal remaining after a search algorithm removes frequencies that are statistically significant (e.g., no gear tooth count is needed). Further analysis of the residual can be made by taking the envelope of the residual, squared. The envelop of the threshold residual (RES), squared, is denoted as amRES and given by Equation 1:

$$amRES = |Hilbert(RES^2)| \quad \text{(Equation 1)}$$

where Hilbert is the Hilbert transform function.

In more complex gearboxes, it is not always clear from the sideband modulations how severe a gear tooth defect might be. Further, for early faults, such as a fatigue crack, a more effective analysis may be needed. By using band pass filtering to remove gear mesh harmonics (e.g., the narrow band analysis, where the bandpass is approximately 25% of the gear tooth count), and then enveloping, one can directly measure the amplitude and phase (frequency) modulation present in the original time synchronous average. As a compromised gear component, such as a soft/cracked tooth, enters the load zone the reduced stiffness of the damaged tooth transfers load to the surrounding teeth. This transfer of load affects both the displacement of the tooth (resulting in an amplitude modulation) and the rotational speed of the gear (resulting in a frequency modulation).

The Teager energy operator is a nonlinear tracker which, given an amplitude signal and a phase modulated signal, can measure the product of their instantaneous frequencies. This analysis can be quite sensitive to torque, and so condition monitoring analysis for components exhibiting torque effects often use kurtosis and crest factor, which tend to normalize the change in magnitude due to torque effects.

Variants of the Teager energy operator (EO) have been used in order to try to improve the fault detection performance of the EO analysis. The EO ($\Psi$) for a TSA signal may be determined by Equation 2:

$$\Psi_{EO}(TSA_n) = TSA_n^2 - TSA_{n+1} \times TSA_{n-1} \quad \text{(Equation 2)}$$

where n is the time domain index of the TSA. As will be seen, the TSA is usually interpolated as a radix 2 value. The computational enhanced energy operator ($\Psi_{CEEO}$) is determined by Equation 3:

$$\Psi_{CEEO}(TSA_n) = TSA_n^2 - TSA_{n+2} \times TSA_{n-2} \quad \text{(Equation 3)}$$

The Figure of Merit 0 (FM0) is generally calculated via Equation 4:

$$FM0 = \text{tsa peak to peak} \Big/ \sum_{i=1}^{3} GM_i \quad \text{(Equation 4)}$$

where $GM_i$ is the $i^{th}$ gear mesh harmonic taken from the Fast Fourier Transform (FFT) of the TSA, i is the gear mesh harmonic order, and tsa peak to peak is the distance between the maximum amplitude and the minimum amplitude of the signal. The peak to peak feature is a time domain phenomenon (from a tooth impact or a breathing crack), whereas the gear mesh harmonic is calculated with the FFT and is not sensitive to soft tooth features. Hence, as tooth damage increases, so too does FM0.

There are a number of other miscellaneous, common gear fault analysis, such as the energy ratio, the sideband level factor, and the G2 analysis. The energy ratio is the residual root mean square (RMS) divided by the TSA RMS. As the gear fault progresses, the residual RMS will approach the TSA RMS (i.e., the TSA will be dominated by gear mesh signatures associated with the gear fault). If the residual signal is denoted as $r_i$, and the TSA is $tsa_i$, then the energy ratio (er) is determined by Equation 5:

$$er = \sqrt{\frac{\sum_{i=1}^{n}(r_i - \bar{r})^2}{n}} \bigg/ \sqrt{\frac{\sum_{i=1}^{n}(tsa_i - \overline{tsa})^2}{n}} \quad \text{(Equation 5)}$$

where n is the time domain index of the TSA, $\bar{r}$ is the mean residual signal, and $\overline{tsa}$ is the mean TSA signal. The sideband level factor (SLF) is the sum of the first order sideband amplitudes about the gear mesh, divided by the TSA RMS as shown in Equation 6:

$$SLF = TSA_{gm-1} + TSA_{gm+1} \bigg/ \sqrt{\frac{\sum_{i=1}^{n}(tsa_i - \overline{tsa})^2}{n}} \quad \text{(Equation 6)}$$

where $TSA_{gm-1}$ is the TSA signal amplitude at the lower first order sideband around the gear mesh frequency and $TSA_{gm+1}$ is the TSA signal amplitude at the higher first order sideband around the gear mesh frequency.

The ratio of the second gear mesh harmonic energy to the first gear mesh harmonic energy can be used as another analysis (known as a G2 analysis). Typically, when there is a gear damage, the gear mesh harmonics increase, which causes the ratio of the second gear mesh harmonic energy to the first gear mesh harmonic energy to increase with damage.

The TSA signal is generated by resampling data to account for variation in shaft rates, which confers a number of benefits. An assumption of the Fourier transform is stationarity, i.e., that the signal does not change over time. Due to limits in the bandwidth of the motor/engine controllers, there is always some change in shaft rate. This change in shaft rate can be measured directly with a tachometer, which is apparent from the data shown in FIG. 2, which is a graph 200 of power turbine shaft rate 204 of a light helicopter over time. The tachometer sample rate is 48,000,000 samples per second and accurately measures the speed of the engine power turbine shaft, and, as such, when an appropriate ratio is applied, can be used to find the shaft rates of other shafts in the gearbox. Note that the shaft rate is not constant. The variation in shaft rate is due to changes in torque coming from the main and tail rotors. Any inputs from the flight control, and in forwarded flight (the added lift of the advancing blade) causes a torque ripple in the engine. Because of the finite bandwidth of the engine controller, the engine speed changes, resulting in changes in shaft rate over time.

Figure 2:
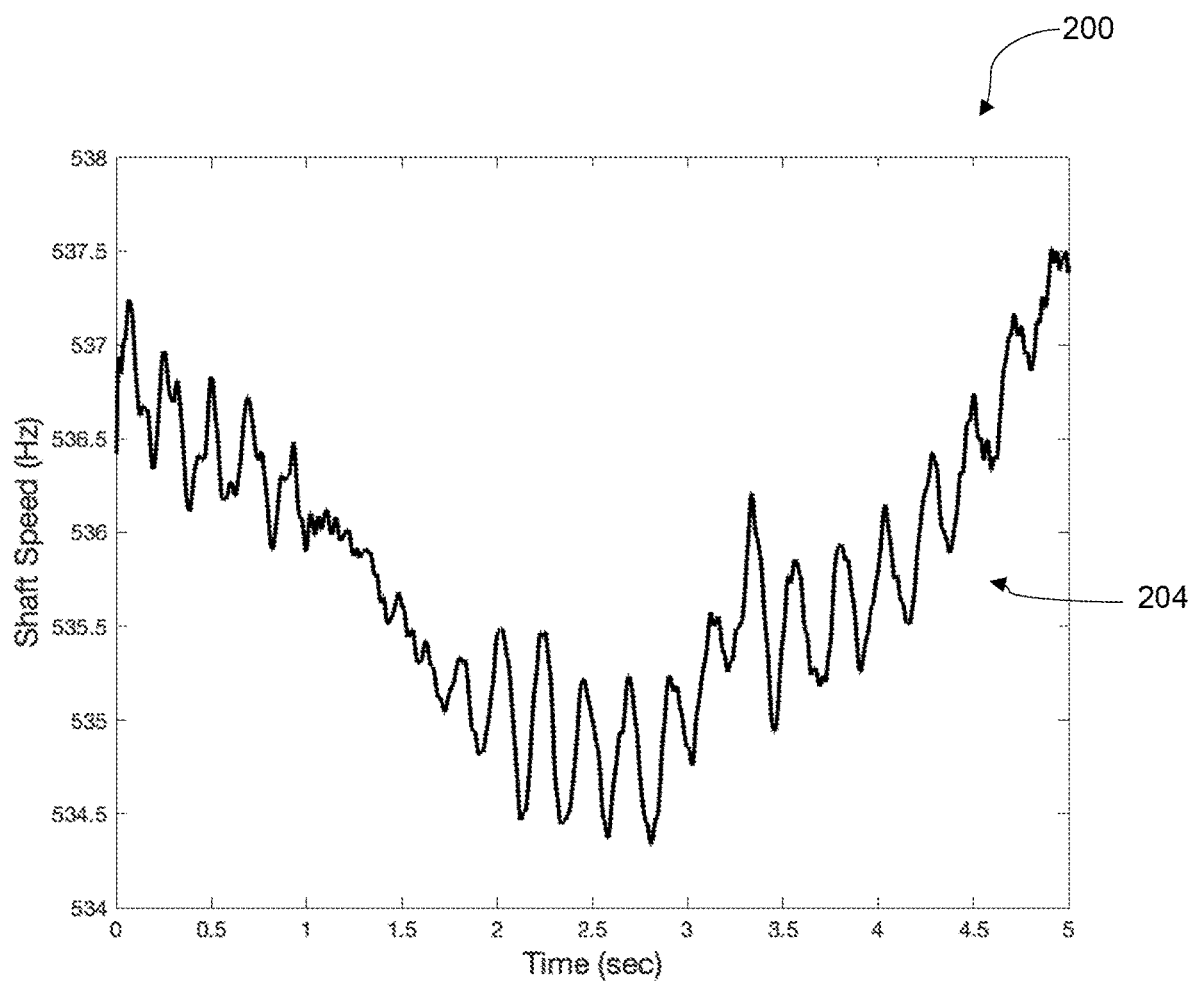
FIG. 2 is a graph of the power turbine shaft rate of a light helicopter.

These changes in shaft rate over time invalidate an assumption of stationarity when using the Fourier transform. This causes a smearing of the spectral content, as the energy associated with a shaft or gear is spread across a number of frequencies. As can be seen in FIG. 2, shaft rate 204 varies from 534.2 Hz to 537.5 Hz. If one was interested in the gear mesh frequency of this shaft (which has, as an example, 35 teeth), then, for this range of shaft rates, the gear mesh frequency would range from 18,697 Hz to 18,813 Hz. The sample rate of the condition monitoring system may be, for example, 93,750 samples per second. Using the FFT, the length (i.e., the number of data points) of the analysis is typically some radix-2 value, for example 16,384. Given this length, then each FFT bin would have 2.86 Hz. In this scenario, the frequency of the gear mesh is spread across 41 bins—hence, the representation of a feature would not be measured accurately by the FFT. This is one of the reasons why gear and shaft analysis use the TSA, which removes the effect of shaft speed change by resampling the data.

The TSA resamples the vibration associated with a shaft or gear, in the spatial domain, such that vibration associated with each shaft order, in the Fourier domain, represents one frequency bin. For example, in a system in which the shaft rate is such that for a given vibration sample rate the acquisition system on average collects 800 samples per revolution, the TSA would resample the 800 samples to 1024 data points (1024 is the next highest radix-2 value from 800).

As the load on the shaft reduces, the shaft rate increases, so the number of measured vibration samples decreases, for example, to 780 samples. Since it takes less time for the shaft to make one revolution, there is less time to collect samples per revolution. Those 780 samples are then also resampled to 1024 points. If, on the other hand, the load on the shaft increases, slowing the shaft rotation, more samples would be measured, such as 820 samples. These 820 samples would also be resampled to 1024 data points. For every revolution, the resampled data is summed point by point. After n revolutions, each of the 1024 summed points of is divided by n, essentially time synchronously averaging the vibration data.

If, in the above example, there is a gearbox with a 35-tooth gear on the shaft, the gear mesh energy of the gear would be a frequency of 35 times the shaft rate. In the Fourier domain, the energy associated with the shaft rate would be in bin 2, and the gear mesh energy would be in bin 36, and the second harmonic of that gear would be in bin 71 (i.e., 35×2+1, as bin 1 is the DC energy). The TSA also reduces non-synchronous vibration by 1/sqrt(n), where n is the total number of shaft revolutions which were used to construct the TSA. In this way, the TSA corrects for variation in the shaft rate and improves the signal to noise ratio. For non-synchronous signals, the TSA operates as a finite impulse response (FIR) filter.

Time Synchronous Resampling (TSR) similarly resamples (i.e., up-samples) the vibration to correct for variation in shaft speed. The apparent sample rate is the ratio of the total resampled time domain, and is found by dividing the vibration data set length by the original data set length and then multiplying by the original sample rate.

Both the TSA and TSR techniques use a tachometer signal to calculate the time over which a shaft completes one revolution. The time taken for any shaft to complete a rotation can be calculated even if the tachometer is not directly monitoring a given shaft of interest elsewhere in a gearbox. This is done by taking into account the shaft ratio from the shaft with the tachometer to the shaft under analysis, and then extrapolating the rotation rate of the shaft under analysis from that tachometer signal. (As noted, due to gear system dynamics, the actual rotation rate will vary from the rotation rate determined based on the shaft ratio.)

Figure 3A:
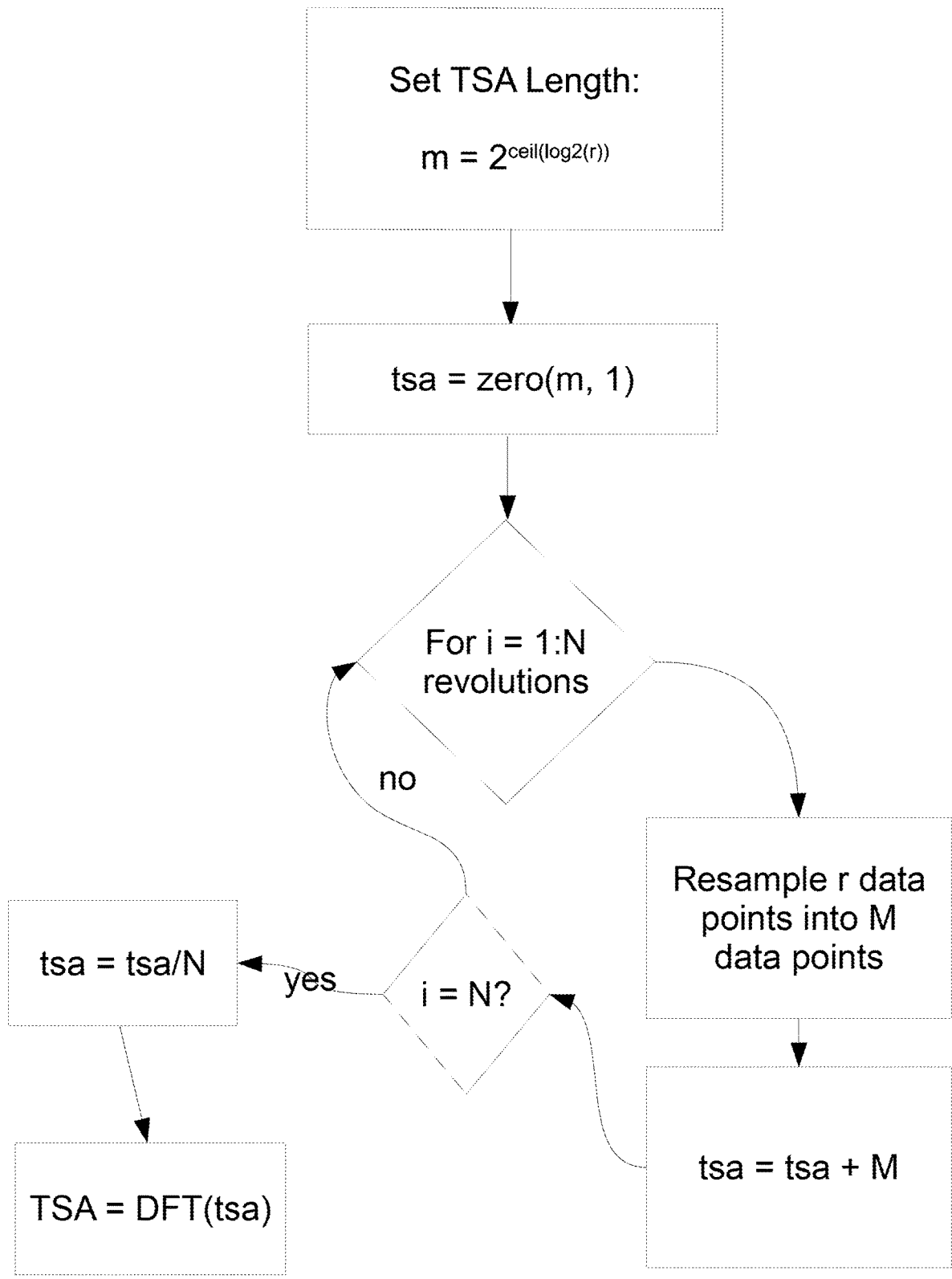
FIG. 3A is a diagram depicting data flow for a time synchronous average algorithm.
Figure 3B:
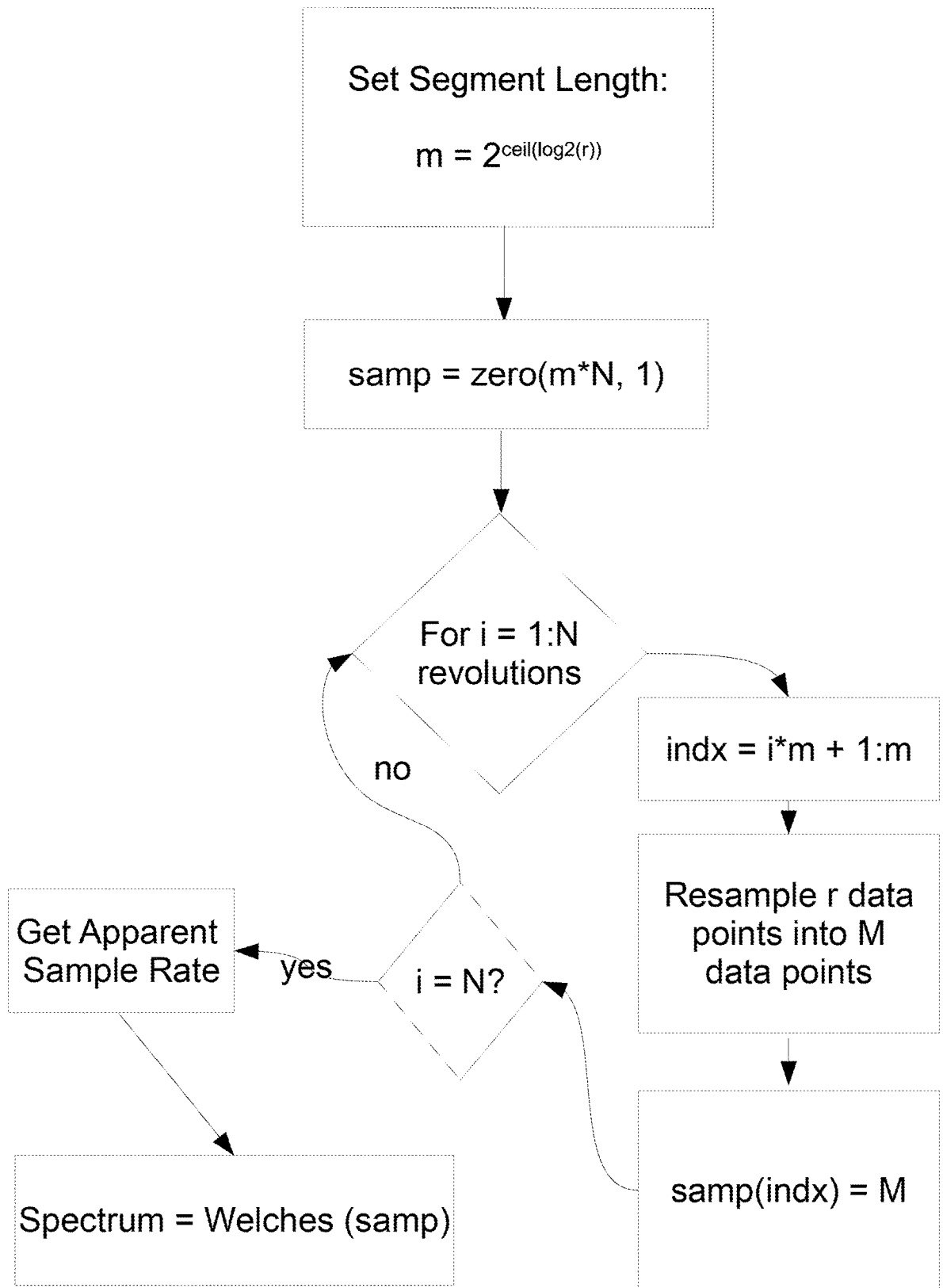
FIG. 3B is a diagram depicting data flow for a time synchronous resampling algorithm.

FIG. 3A summarizes an algorithm for implementing TSA and FIG. 3B summarizes an algorithm for implementing TSR. For the TSA algorithm, the TSA length is set to the next highest radix-2 value from the number of samples. The TSA values are zeroed from the TSA length to the determined radix-2 value. For each revolution, each data point is resampled into M data points, and the TSA values are adjusted by adding the latest measured value. When all the sampled revolutions have been tallied, the cumulative TSA values are divided by the number of sampled revolutions. Those averaged TSA values are measured by transforming into a vibration signal via Fourier transform.

For the TSR, turning to FIG. 3B, a segment length is set to the next highest radix-2 value from the number of data points taken. Then the sample values are zeroed from the sample number up to the radix-2 value. The apparent sample rate is the ratio of the total resampled time domain, and is found by dividing the vibration data set length by the original data set length and then multiplying by the original sample rate. For each sampled revolution, each of the data points are resampled into the radix-2 number of data points and the sample values at each point are set to the value associated with a corresponding measured sample point. This is repeated for all measured revolutions and the spectrum is derived from the determined sample values. Thus, while the TSA averages each vector of data, representing the resampled data for each revolution, the TSR appends the data to the previous resampled data vector.

Gears often use an involute profile. In involute gear design, the contact between a pair of gear teeth occurs at a single point where two involutes of the same spiral hand meet. Contact on the other side of the teeth is where both involutes are of the other spiral hand. Rotation of the gears causes the location of this contact point to move across the respective tooth surfaces. The tangent at any point of the curve is perpendicular to the generating line irrespective of the mounting distance of the gears. This means that the line of the force follows the generating line, which is tangent to the two base circles.

Figure 4:
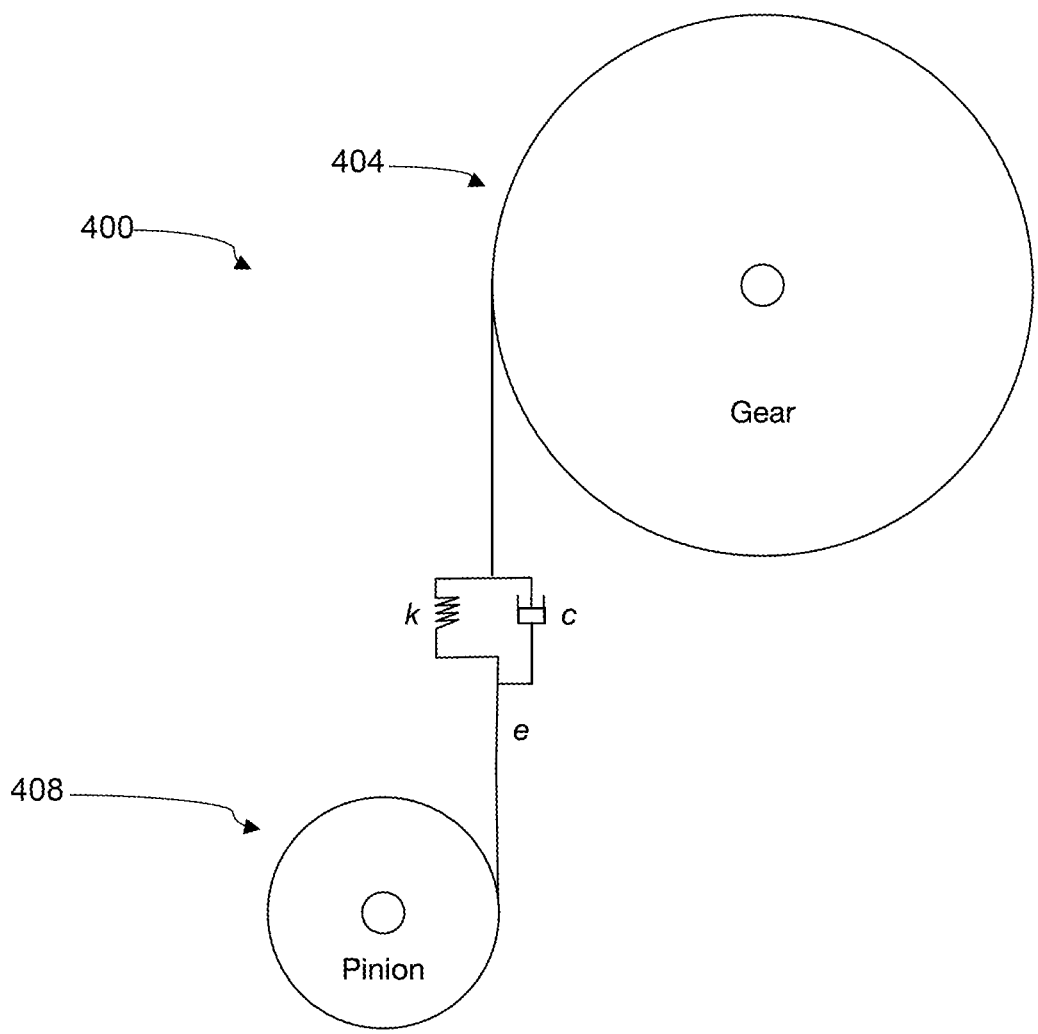
FIG. 4 is a schematic depiction of gear dynamics.

The force, or the line of action, moves along the radius of the drive tooth (pinion) to the driven tooth (gear). As this occurs, the moment on the drive tooth increases, which changes the force applied to the base of the tooth. As the force is relatively constant, the tooth is deflected. This simultaneously occurs on the driven tooth as well. This phenomenology can be considered a damped mechanic oscillator and the behavior can be modeled as a lumped mass system as depicted schematically in FIG. 4, which depicts a simplified gear dynamics model 400 in which a gear 404 interacts with a pinion 408, and where c is the mesh damping constant, k is the time varying mesh stiffness, and e is the external displacement excitation. Since a gear system acts essentially as a damped harmonic oscillator, it will have a transfer function, which acts as an infinite impulse response (IIR) filter on an input signal. For a gearbox with more than one gear pair, the transfer function is the convolution of each gear pair response. Even for simple gearboxes, this can be a complex behavior to the extent that gearboxes are generally designed to minimize the excitation of multiple transfer functions inherent in involute design gears (i.e., gearboxes are designed to not operate in resonance). This phenomenon is known as gear system dynamics.

The input signal (e.g., the band limited engine/motor RPM) to a gearbox (e.g., the main shaft rate) is a complex and dynamic time varying function. Thus, the shaft rates for shafts that are displaced physically apart (in terms of gear dynamics) from the shaft that the tachometer is measuring can be very different than the shaft rates that would be predicted based on the shaft ratio alone. Because of this discrepancy between the predicted and actual rotation rate of components under analysis, the effect of gear system dynamics is deleterious to the TSA analysis used for condition monitoring. Accordingly, for components for which a tachometer is not directly measuring rotation rate, the defect/fault analysis may be degraded.

Previously, this discrepancy had not been observed because of limitations in the ability to determine the actual rotation rate of components "downstream" from the shaft being measured with a tachometer. However, due to how condition monitoring systems are typically installed, this phenomenon should be expected. For example, in an installation of a condition monitoring system on a helicopter drivetrain system, the tachometer is mounted conveniently, which typically means on the main shaft. This means that for any other rotating components, gear system dynamics could affect the rotation rate and no tachometers are installed to detect such variation.

Since the gearbox components/interactions are relatively stiff, it is generally assumed in these systems that the shaft rate of a different shaft than the shaft that the tachometer is mounted on differs only by the ratio between the shafts. For example, for an input shaft to the main gearbox on a light, single engine helicopter, a tachometer directly measures the rotation rate of the engine power turbine shaft. The turbine engine itself has a reduction gearbox that has a ratio from the power turbine shaft, approximately 0.196, such that while the power turbine shaft RPM is 32,000, the input shaft the main gearbox module RPM is 6,300 rpm.

If the rotation rate of the shaft at the gear under analysis is similar to the expected shaft rate based on the shaft rate where the tachometer measures shaft speed and the intervening shaft ratio, the spectrum of the TSA will be similar to the power spectrum of the raw signal. For example, if the gearbox input pinion has 19 teeth, then one would expect that the TSA signals for shaft order 1, shaft order 19, and perhaps a higher harmonic (in this case, the $3^{rd}$ gear mesh harmonic, or shaft order 57) would be similar to the corresponding raw signals.

Figure 5:
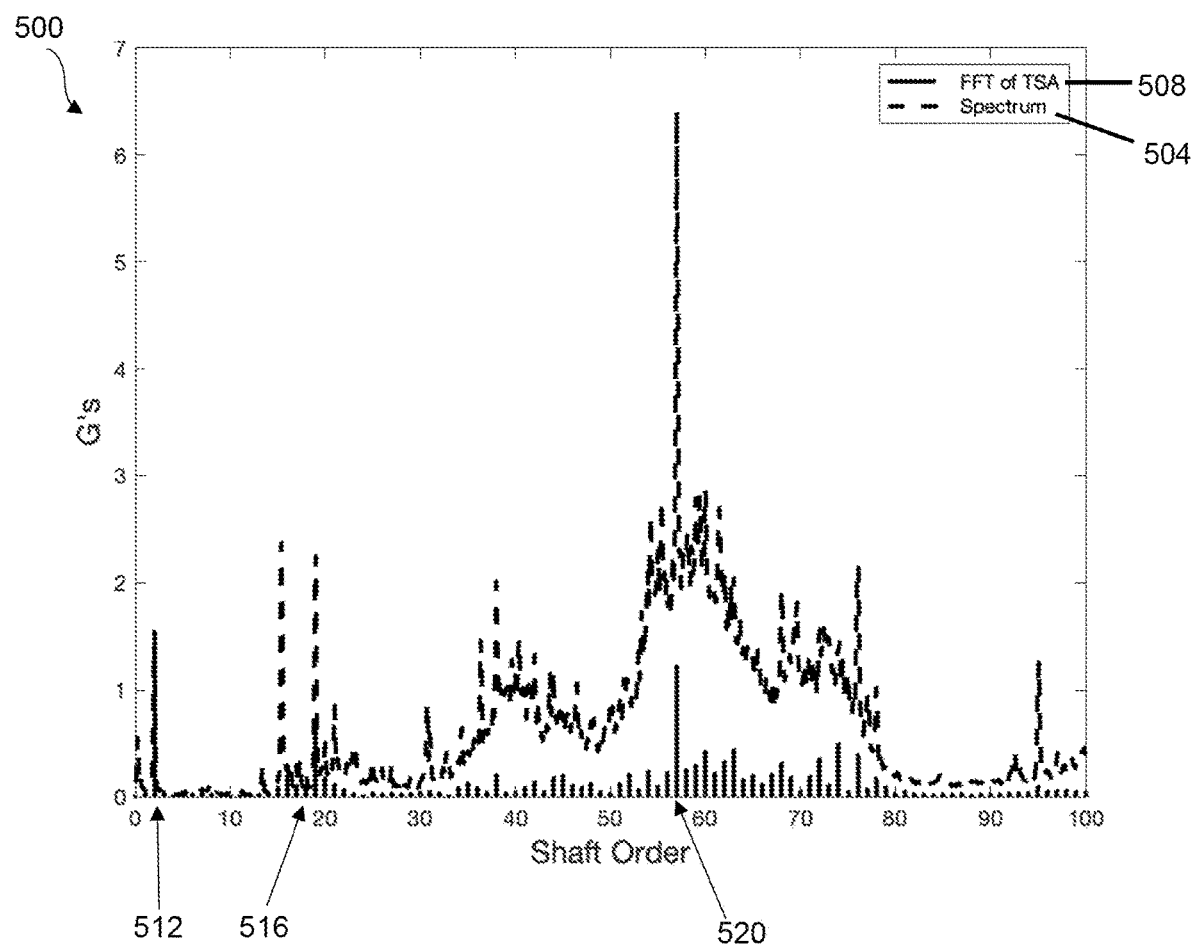
FIG. 5 is a graph of force versus shaft order for TSA and raw signals.

As can be seen in FIG. 5, which is a graph 500 of determined force versus shaft order for a component based on a raw spectrum 504 and a spectrum 508 from an FFT of a TSA signal. Raw spectrum 504 and TSA signal 508 for shaft order 1 (i.e., 512) are similar, but for shaft order 19 (i.e., 516, the gear mesh frequency) TSA signal 508 is 0.7 g, while raw spectrum 504 is 2.52 g. For the $3^{rd}$ gear mesh harmonic (i.e., 520, shaft order 57), TSA signal 508 is 1.2 g, while raw spectrum 504 is 6.4 g. This means that the TSA performance is degraded because the gear system dynamics are not accounted for.

As noted, since the TSA is an average in the spatial domain, the TSA itself has a measurable transfer function. This transfer function is in effect a stationary low pass filter, where DC represents perfect timing. Note that for higher harmonics, timing error in the zero cross times (e.g., for the tachometer signal) are linearly related with the shaft order. Hence the timing error for the 3rd gear mesh harmonics are 57 times more sensitive than the timing error for shaft order 1. This is why the shaft order 1 values are the same for the TSA and raw spectrum (in the example shown in FIG. 5). In the present example, the TSA has 210 averages and as such the filter can be represented as a 210-order finite impulse response filter where the coefficient b is 210 values of $\frac{1}{210}$.

Figure 6:
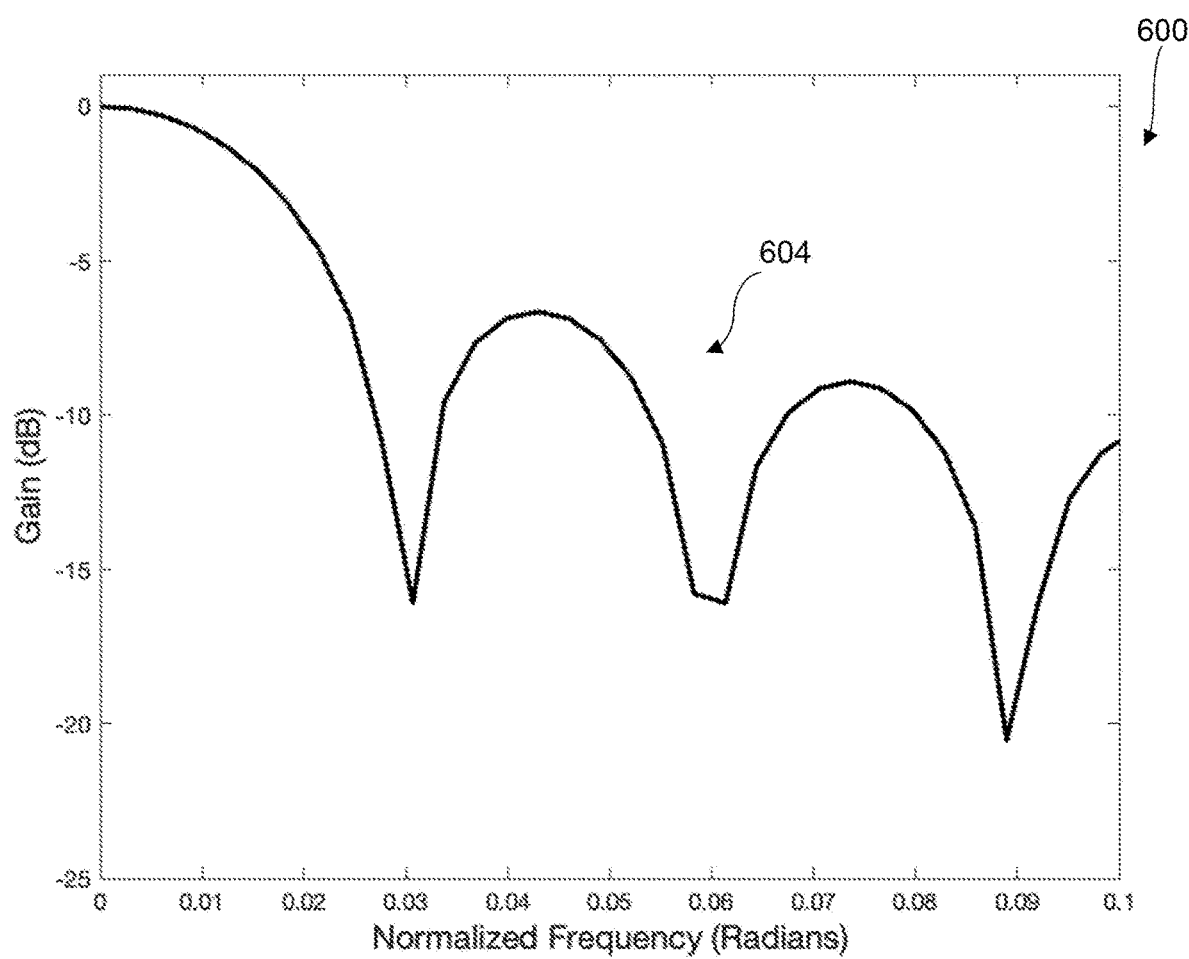
FIG. 6 is a graph of normalized frequency versus gain for a TSA response.

FIG. 6 is a graph 600 of normalized frequency vs. gain, which shows the loss in gain of a signal of interest 604 as a function of how far off the assumed rotational frequency of the monitored component is from the actual rotational frequency. As is evident, even a small error in timing, such as normalized frequency of 0.015 radians, results in −5 dB gain. This can explain why the shaft order 57 shows a TSA energy reduction of −7.3 dB compared to the raw spectrum (shown in FIG. 5).

In order to enhance the analysis of vibration spectra, in an embodiment, rotation rate information is generated from vibration data and is then used to account for local gear system dynamics. If the rotation rate determined from a tachometer reading and the shaft ratio is off by just a small percentage from the actual rotation rate, signals indicative of faults (which can be an order of magnitude or more less than the overall vibration signal) may be diminished or unrecoverable from the vibration spectrum. Typically, it is expected that using this technique to correct for gear dynamics will improve the signal-to-noise ratio of a fault feature by about 1.5 to 7 dB.

Vibration signals from rotating equipment are sinusoidal and, by definition, synchronous with signals associated with the shaft rotation. However, the nature of vibration requires significant signal processing of vibration signals in order to extract useful information. Measured vibration is the superposition (i.e., addition) of many signals in the time domain. For example, consider a simple gearbox with an input shaft, an output shaft, and a gear pair. The input shaft turns at 30 Hz and has a 32-tooth gear, and the output shaft has an 82-tooth gear with a rotational speed of 11.707 Hz. The gear mesh frequency is 960 Hz (30*32). The gear mesh frequency will have sidebands as a result of any shaft imbalance being modulated onto the gear mesh. This can be proved using the trigonometric identity show in Equation 7:

$$\cos(a)*\cos(b)=\tfrac{1}{2}[\cos(a+b)+\cos(a-b)] \quad \text{(Equation 7)}$$

where, in this example, cos(a) is 960 Hz, and cos(b) is 30 Hz and/or 11.707 Hz shaft. Additionally, if the shaft is bent or bowed, there will be a 2× shaft vibration component. Other manufacturing defects, such as the gear not being mounted perpendicular to the shaft, or not centering the shaft on the gear (e.g., eccentricity), will result in additional tones.

To recover only those signals associated with a desired component, one can use an ideal bandpass filter and create an analytic signal in one functional procedure. This is followed by using a jitter reduction model to remove noise (jitter) from the reconstructed tachometer signal not associated with changes in machine rate. While this system could be implemented on any computer, it is preferably implemented in this context in a smart vibration/accelerometer sensor. A smart sensor allows for parallel processing, reducing the total time required for analysis and allowing for data acquisition to be performed more often.

Recovering rotational information from vibration data involves using an estimate of the rotation rate of a component under analysis based on the tachometer measurement of a shaft and the shaft ratio to that component. From this information, a known gear mesh frequency for the component may be estimated. A range of frequency encompassing the estimated gear mesh frequency is found based on the variance in the measured shaft rate. By filtering around this range, the actual gear mesh frequency may be extracted from the overall vibration data even though its magnitude may be significantly smaller than the average overall vibration spectrum. Once the gear mesh frequency signal is determined, the actual shaft rate of the component of interest can be found. This may be accomplished for example in accordance with the following pseudo code:

Define the Sample Rate=sr. The number of data points, n, of vibration data equals sr×acquisition length in seconds, then:

Calculate the next larger radix-2 length for the FFT: nRadix=$2^{ceil(log\ 2(n))}$.

From the tachometer measurement and the gearbox configuration (i.e., the shaft ratio from the shaft measured by the tachometer to the shaft under analysis), calculate meta statistics such as approximate rotation rate of the shaft under analysis (i.e., the first moment), the variation (i.e., the second moment) in the approximate rotation rate, and the estimated known gear mesh frequency (based also on the number of teeth of a gear on the shaft under analysis).

From the estimated known gear mesh frequency and the variance in the estimated shaft rotation rate, calculate the low bandwidth index and the high bandwidth index (bwlow, bwhigh), which will encompass the gear mesh frequency of interest.

Take the zero padded FFT of the vibration data.

Zero the FFT from zero to bwlow, and from bwhigh to nRadix.

Take the inverse FFT to generate the analytic signal.

Calculate the unwrapped argument of the generated analytical signal from 1 to n in the time series. (The argument is the arctangent of the imaginary part of the analytic signal, to the real part of the analytic signal. Note that the value can only go from 0 to π and −π to 0. One is interested in the cumulative rotation of the analytic signal in time, hence as the signal exceeds −π to some small positive number, 2γ is added to it. That is, if at index i the value is −0.0371, and the next value calculated at index i+1 is 0.03π, the saved (unwrapped) value is 2.03π.)

Normalize the time series of radians by the number of teeth of the gear (assuming $1^{st}$ order harmonics).

Interpolate the number of indexes for every 2π radians. The value 2π radians is one zero crossing. Hence, the interpolation gives the exact index of the zero cross of the shaft.

Normalize to "tachometer" zero crossing index by the Sample Rate (sr), which provides the zero cross time and from which the rotation rate for the component under analysis is calculated.

A bandpass filter is the convolution of a low pass filter with a high pass filter. These filters are implemented as Finite Impulse Response (FIR) filters to improve their stability. However, even rather large filters have a poor response. Consider a case of a wind turbine gearbox, with an approximately 29 Hz shaft and a 32-tooth gear, which has a frequency of 928 Hz. The bandwidth of the filter is set from 910 Hz to 950 Hz to exclude the frequencies associated with the 30 Hz of the high-speed shaft (i.e., 29*32−29=899 Hz and 29*32+29=957 Hz). Using a large, 120 tap FIR filter, the bandwidth (at 50% power, 3 dB) of this filter is 1670 Hz. The filter does not reject the spectral content at 500 Hz, or at 1121 Hz, because the filter is not ideal and suffers from spectral leakage. These additional frequencies will be superimposed on the 928 Hz signal and will distort the desired analytic signal, reducing the quality of the resulting tachometer signal.

A process may be used in which developing the analytic signal using an ideal bandpass filter is completed in a single functional process. The analytic signal is defined for the real-valued signal s(t), as determined in Equation 8 (and with reference to Equations 9 to 12):

$$S(f)=F\{s(t)\} \qquad \text{(Equation 8)}$$

where F is the Fast Fourier Transform, and where:

$$S_a(f)=S(f), f=0 \qquad \text{(Equation 9)}$$

$$S_a(f)=2S(f), f>0 \qquad \text{(Equation 10)}$$

$$S_a(f)=0, f<0 \qquad \text{(Equation 11)}$$

$$S_a(t)=F^{-1}(S_a(f)) \qquad \text{(Equation 12)}$$

where S(f) is the Fourier transform of s(t) and f is measured signal frequency.

For a signal sampled at 97,656 samples per second, for six seconds, the total length of s(t) is n, or 585,936 data points in this example. As noted, there are advantages to using radix-2 lengths for the FFT. By zero padding the FFT to next larger radix two value, $2^{20}$ (1,048,576), the index representing the cutoff frequency for the bandpass frequencies are: bwlow=9771 Hz (910 Hz/97656×1048576), and bwhigh=10308 Hz (960/97656*1048576). Then the bandpass analytic signal can be determined via Equations 13 to 15 as follows:

$$S_a(f)=2S(f), bwlow \leq f \leq bwhigh \qquad \text{(Equation 13)}$$

$$S_a(f)=0, f<bwlow, f>bwhigh \qquad \text{(Equation 14)}$$

$$s_a(t)=F^{-1}(S_a(f)) \qquad \text{(Equation 15)}$$

where $F^{-1}$ is the inverse Fourier transform. Note that what is of interest is the arctangent ratio of the imaginary parts of $s_a(t)$ and the real parts of $s_a(t)$, which is the argument. The argument is important because it represents the angle of the sinusoidal signal that is, by definition, synchronous with the shaft. As the shaft turns in time, the angle incrementally increases by the shaft rate times the shaft harmonic. The idealized bandpass function rejects all signals not associated with the desired passband.

Further, the arctangent function returns radians between 0 to π and −π to 0. However, the evolution of the angle represents the incremental increase in phase for each sample in time. For example, the phase of the analytic signal for three cycles is 2π×3, or 6π. The arctangent of that signal will be −π to π for three cycles. The result of the arctangent must be unwrapped to capture increases in phase vs. time. Unwrapping of the phase angle requires keeping track of the previous angle and current angle. The current angle is added to the previous angle, except when the returned arctangent goes from π to −π. In this case, π is added to the returned value to correct for the case when the returned value is between −π to 0.

After unwrapping the phase angle, the units are in radians per sample. While the FFT and inverse FFT operated on the radix-2 length (in this case 1,048,576), the arctangent and phase angle computation are performed only on the original sample length, n. Note that this time series of radians is for the gear mesh. To convert to radians per revolution of the shaft, the time series is divided by the number of teeth in the gear, which is 32 in this example. However, it may be that the most reliable gear mesh tone is the $2^{nd}$ or $3^{rd}$ harmonic, in which case the passband is adjusted accordingly, and the time series of radian angle is divided by 2× number of teeth for the $2^{nd}$ harmonic.

For epicyclical gearboxes, the expected gear mesh, such as for a ring gear, may be suppressed. As such, while the ring gear of one such gearbox may have 118 teeth, for processing to recover the local zero cross/tachometer signal, due to modulation effects of the planetary gears, the sideband of 120 is more prominent and should be used.

The resulting time series represents the radian angle of the shaft, where each index advances the angle in time by dt, or 1/sample rate. Every 2π radians represents one shaft revolution. Because one is interested in the time, precisely every 2π, a form of interpolation is needed. For example, the index just prior to 2π is 6.282780795474 (or 0.0004 less than 2n) at array index 3395, while at index 3396, the radian value is 6.284629142378, or 0.0014 greater than 2n. Then a desired radian value of 2π is determined by interpolating between the index 3395 and 3396. In this case, the interpolated value is 3395.21885053316.

This interpolation gives the number of indexes for each revolution. Note that this estimate of the tachometer zero cross signal is corrupted by noise. The phase error standard deviation, σ, is related to the local signal to noise (SNR) at the mesh harmonic k in Equation 16 as:

$$\sigma[\delta] = 1/\sqrt{2} \ 10^{-SNR/20} \qquad \text{(Equation 16)}$$

where δ is the phase.

Typical measured SNR is 6 to 8 dB. This suggests that the standard deviation of the phase error would be 6 to 10 degrees. This phase is zero mean but it is non-zero, so it will add jitter to the reconstructed tachometer signal.

The tachometer jitter contains a low-frequency component associated with the engine control unit, as well as random, higher frequency components. The jitter can be removed by using a zero phase, low order, backward/forward IIR filter. As noted previously, for both FIR and IIR filters, their bandwidth is defined by the 3 dB reduction in signal energy. The filter does not remove all signals above the bandwidth, and in fact, reduces some signal energy below the cutoff (up to 50%).

The idealized filter using the FFT processing is zero phase as well. An improved jitter reduction can be implemented for example as follows:
Take the pseudo derivative of the tachometer signal;
Calculate a radix-2 length of the pseudo derivative signal of length n;
Zero pad the array from n to the radix-2 length;
Calculate the bandwidth index of the FFT: Idx=floor (bandwidth*radix-2 length/2);
Normalize the bandwidth value, typically to 0.12;
Take the real FFT of the zero padded derivative signal;
Set the real and imaginary parts of the FFT from Idx to the radix-2 length to zero;
Take the inverse real FFT of the derivative signal; and
Reconstruct the tachometer signal by taking the pseudo integral of the signal.

In addition, jitter reduction techniques are also disclosed in U.S. Pat. No. 10,365,297, granted Jun. 30, 2019 and titled "System and Method for Generation of a Tachometer Signal and Reduction of Jitter," which is hereby incorporated by reference for the disclosure of the same.

Example of the Effect of Gear System Dynamics

Figure 7:
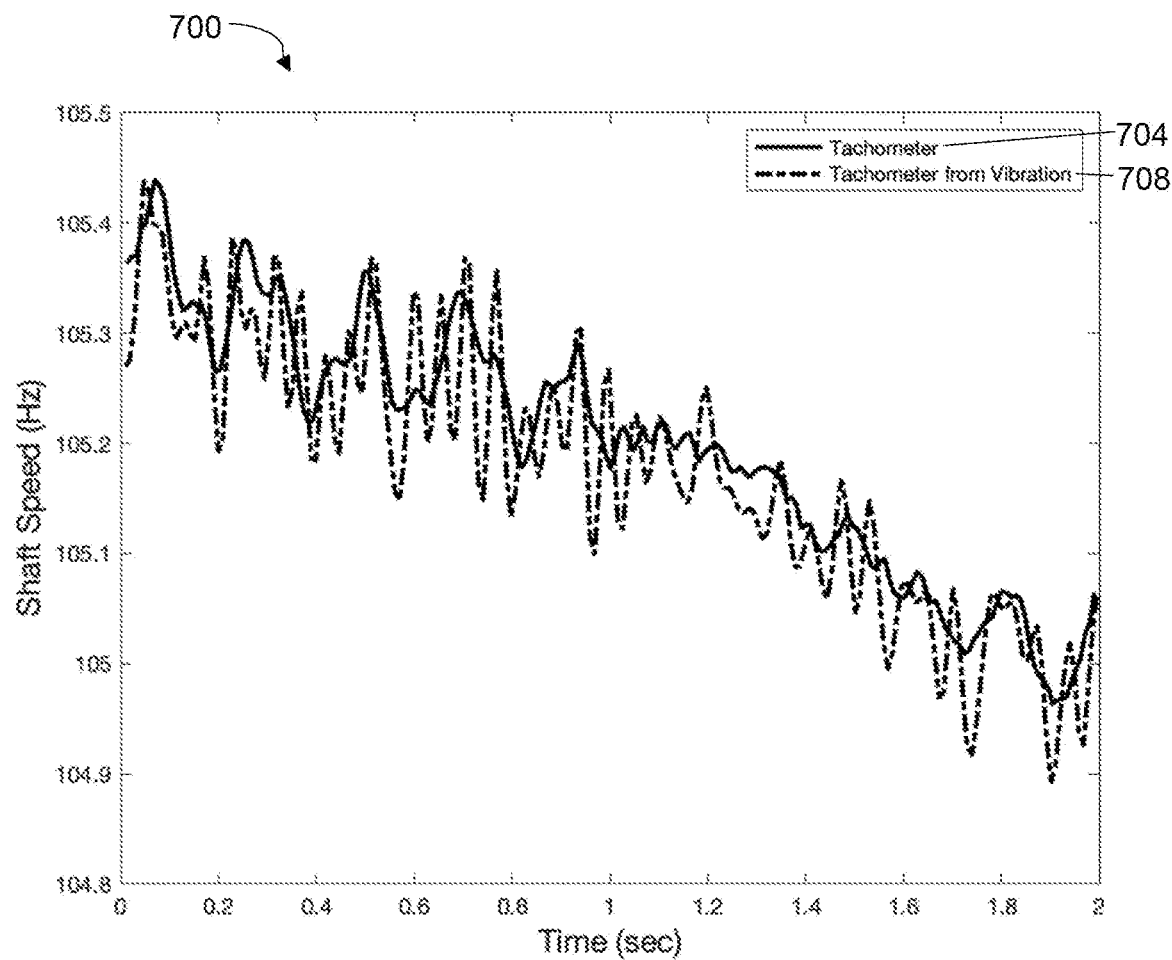
FIG. 7 is a graph comparing a tachometer signal to a tachometer signal generated from vibration measurements in accordance with an embodiment of the present invention.

By comparing shaft speed data generated from vibration data analysis as described above to shaft speed based on a direct tachometer measurement of a different shaft and the shaft ratio, the effect of gear system dynamics on the actual shaft rate can be seen. In FIG. 7, a graph 700 of a shaft speed 704 determined based on a direct tachometer measurement of a different shaft over time as well as a shaft speed 708 generated from vibration data over time. The gear-gear interaction (or transfer function) increases the effect of changes in the shaft rate, so that, as can be seen in FIG. 7, the shaft speed based on vibration data determined in accordance with the above described technique deviates significantly from the shaft speed based on the tachometer readings on a different shaft. It is possible to calculate the transfer function between the initial tachometer reading from the measured shaft and the vibration-based shaft rate (sometimes referred to as the "local tachometer signal"). This is done by taking the Fourier transform of the shaft rate representation of the local tachometer signal (i.e., the one generated from vibration measurements) and by dividing it by the Fourier transform of the shaft rate by the tachometer measurement-based signal. It would then be possible to correct the tachometer signal directly by applying this transfer function. However, the transfer function would change under different torque and RPM regimes, thus not offering a dynamic solution needed by the changing torque environment that are typically of how machines are operated.

Figure 8A:
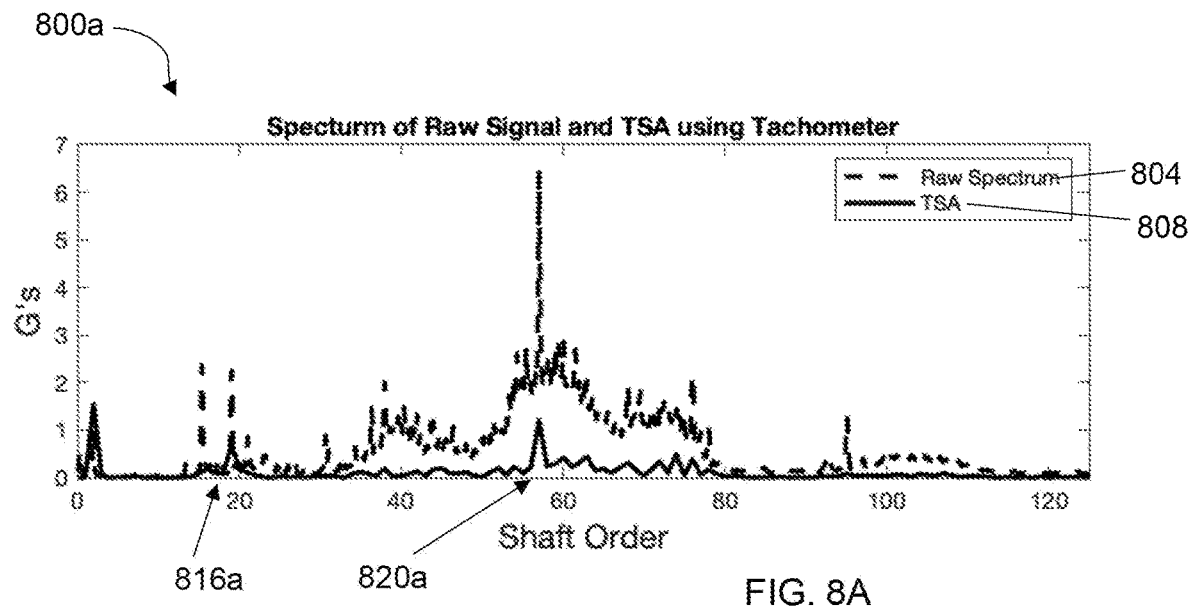
FIG. 8A is a graph showing a raw signal and a TSA signal from a tachometer.
Figure 8B:
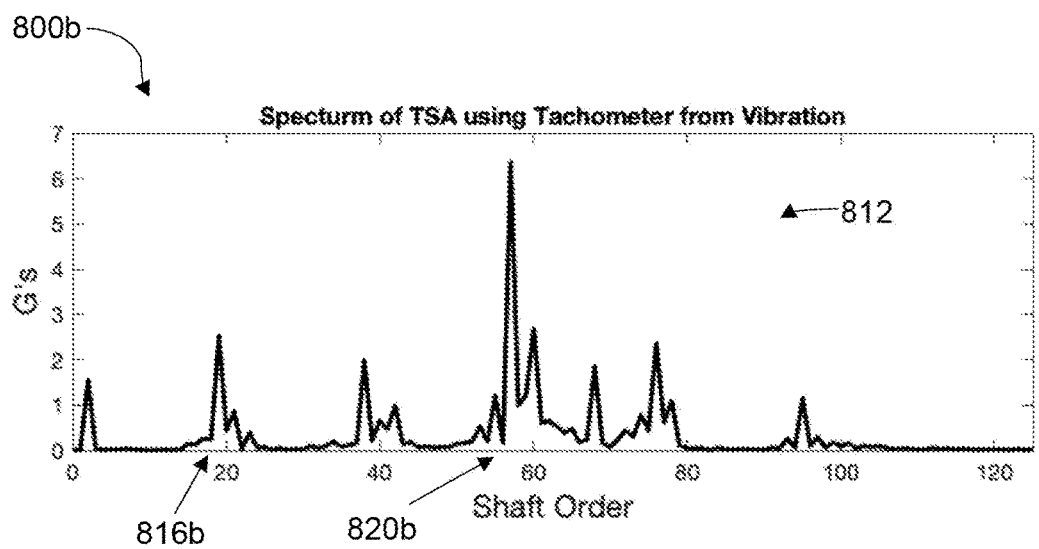
FIG. 8B is a graph showing a raw signal and a TSA tachometer signal generated from vibration measurements in accordance with an embodiment of the present invention.

The effect of adjusting for gear system dynamics on condition monitoring analysis is apparent when the local tachometer signal generated from vibration measurements is used for the TSA signal instead of the local tachometer signal generated from the shaft ratio. As can be seen in FIGS. 8A-8B, spectrum based on tachometer data derived from vibration information improves condition monitoring analysis over a TSA signal based on rotation rate derived from tachometer measurements on a different shaft along with the shaft ratio. FIG. 8A is a graph 800a of force on a monitored rotating component versus shaft order for a raw spectrum 804 along with a TSA signal 808 based on rotation rate derived from tachometer measurements on a different shaft. FIG. 8B is a graph 800b of force on the monitored rotating component versus shaft order for a TSA signal 812 based on rotation rate derived from vibration data. The Pt harmonic 816 (i.e., 816a, 816b, for shaft order 19) and the $3^{rd}$ harmonic 820 (i.e., 820a, 820b for shaft order 57) of the Fourier transform on the TSA are clearly visible in TSA signal 808 generated from vibration data (shown in FIG. 8B). The improvement in the TSA gave a 7.2 dB gain for the $3^{rd}$ gear mesh harmonic 820.

Figure 9:
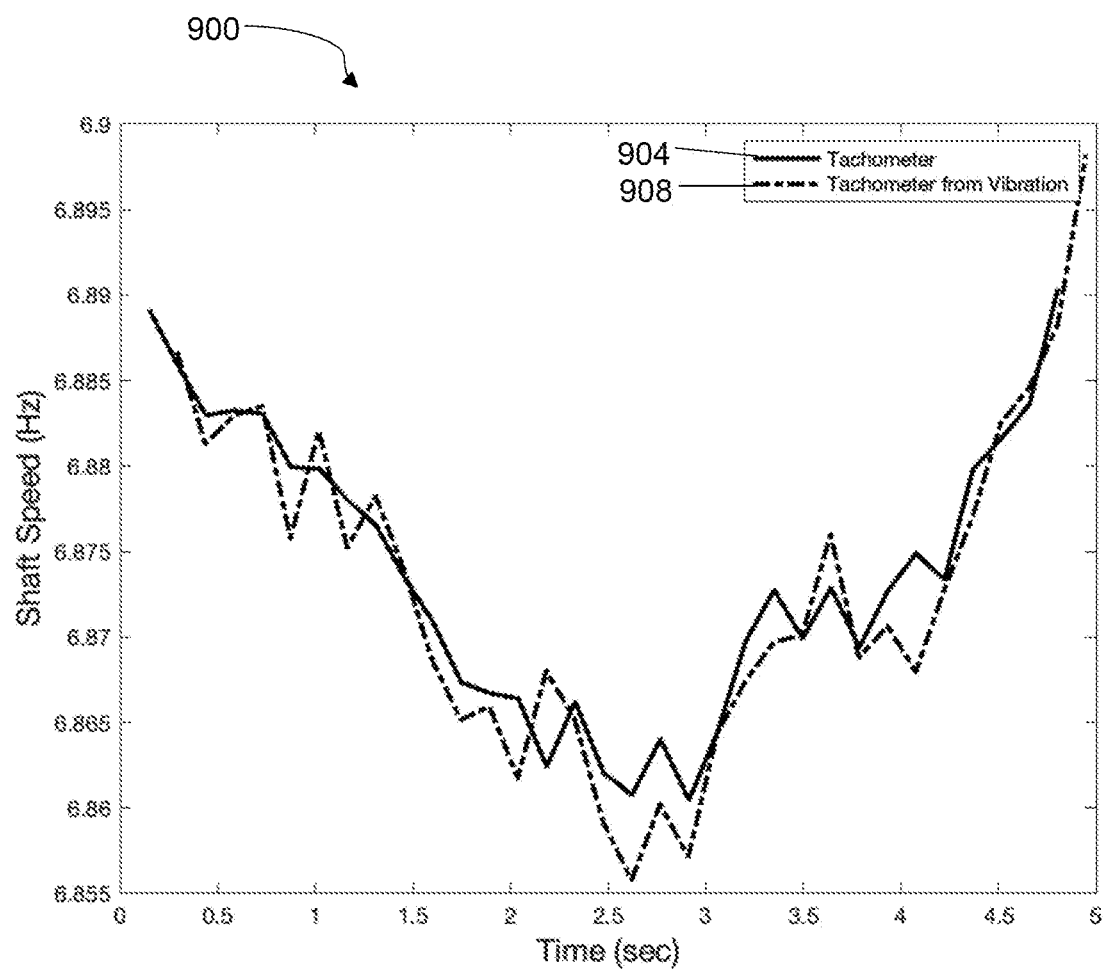
FIG. 9 is a graph comparing shaft rate using a tachometer and shaft rate from a tachometer signal based on vibration measurements in accordance with an embodiment of the present invention.
Figure 10A:
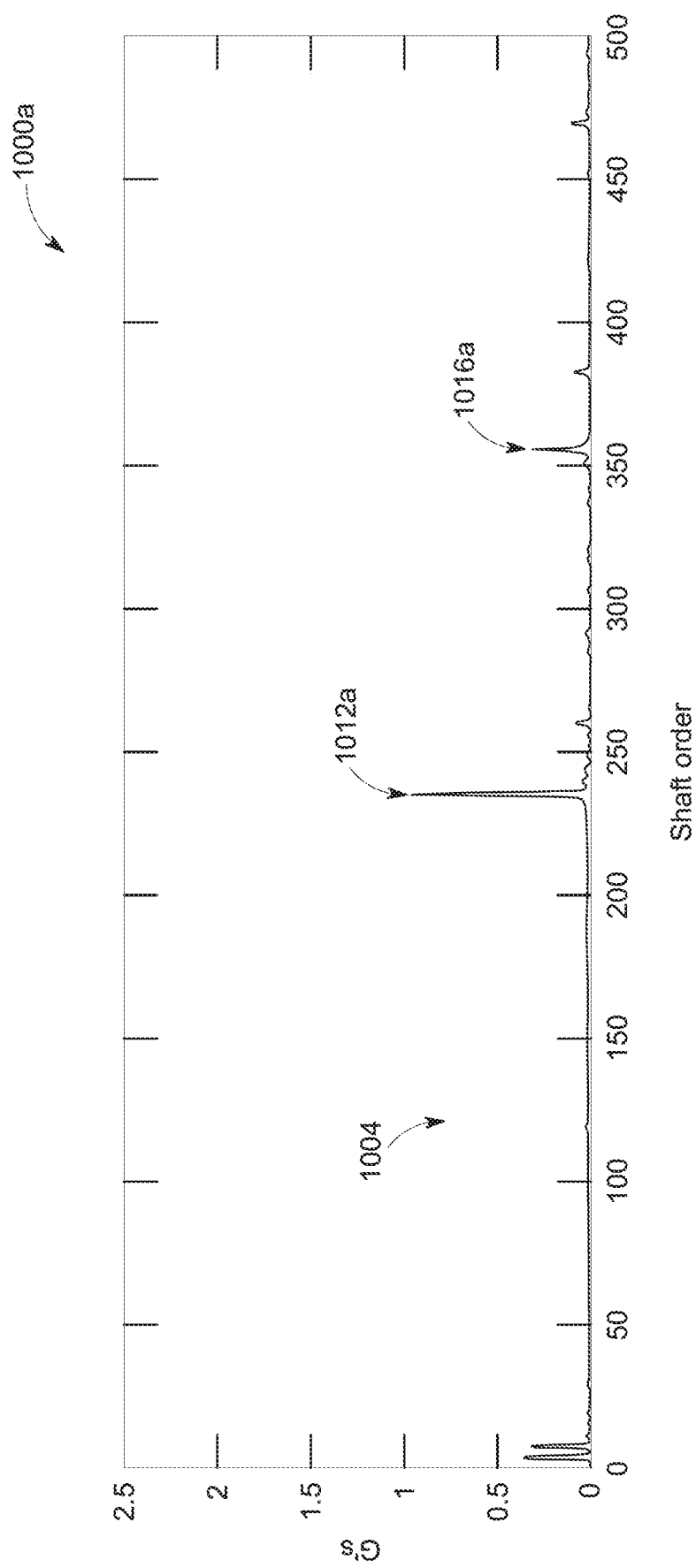
FIG. 10A is a spectrum of TSA shaft order based on tachometer readings.
Figure 10B:
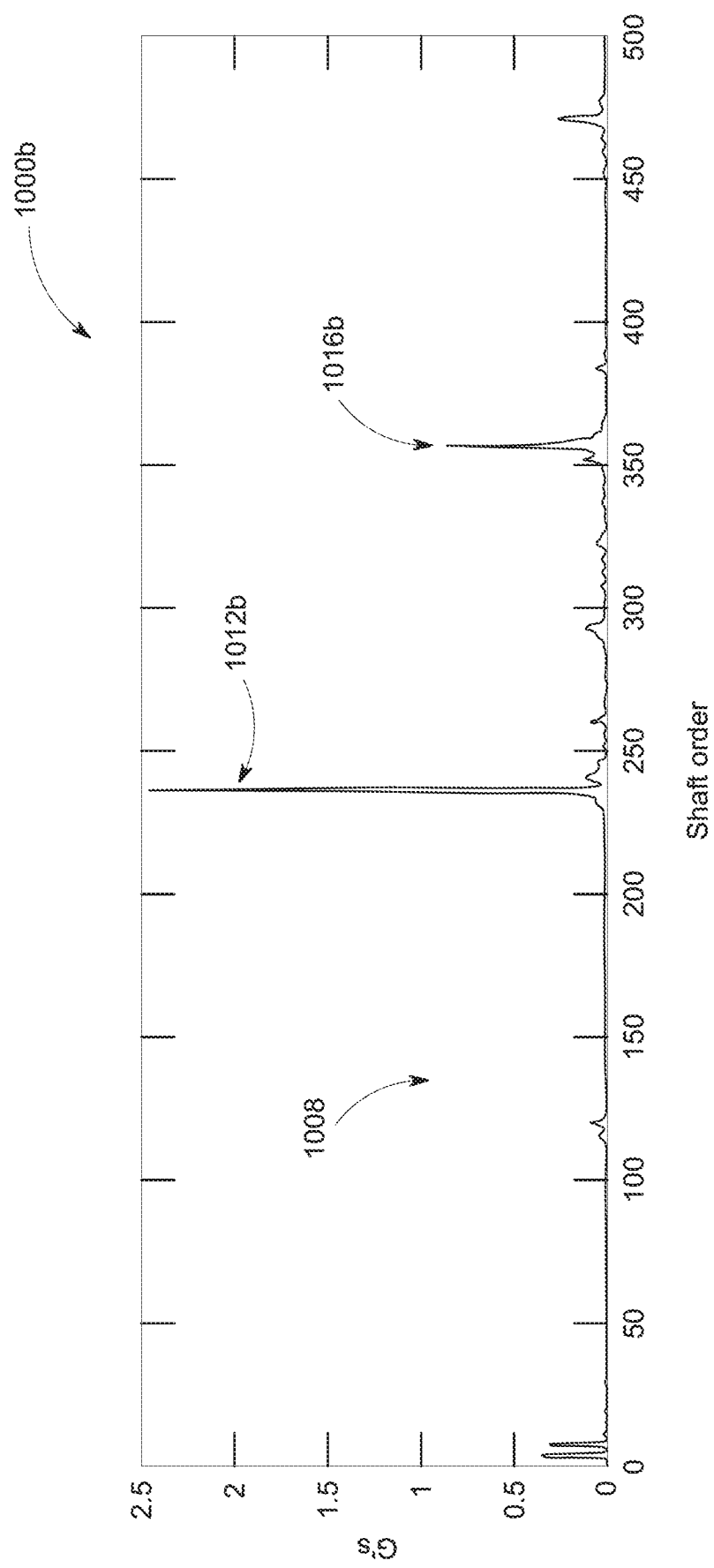
FIG. 10B is a spectrum of TSA shaft order based on tachometer vibration measurements in accordance with an embodiment of the present invention.

As noted above, epicyclical gearboxes pose a different situation in that due to modulation of the planetary gears, the gear mesh signal may be suppressed. In this example, the ring gear mesh is suppressed, but allowing analysis on the second sideband greatly increases the signal to noise ratio, allowing for a better tachometer signal. In FIG. 9, a graph 900 is shown of shaft speed versus time for shaft speed 904 derived from a direct tachometer measurement on a different shaft compared to shaft speed 908 generated from vibration data for an epicyclical gearbox. It can be seen that the determined shaft speeds are similar, which is due to the relatively low frequency of the shaft (6.8 Hz). However, as can be seen in FIGS. 10A-10B, which are graphs 1000 (e.g., 1000a, 1000b) that show force versus shaft order for a TSA signal 1004 from tachometer data and a TSA signal 1008 generated based on the tachometer data and the vibration data, from an epicyclic gearbox. TSA signal 1008 generated based on vibration data has twice the energy at the $2^{nd}$ gear mesh harmonic 1012 (i.e., 1012a and 1012b) and $3^{rd}$ gear mesh harmonic 1016 (i.e., 1016a and 1016b) as the TSA signal from tachometer data.

Improved Processing to Control for Gear System Dynamics

As discussed above, controlling for gear system dynamics results in an improved TSA signal for rotating components in gearboxes, and TSA signals are fundamental to gear fault diagnostics using vibration-based analysis.

Processing for a given shaft is associated with an accelerometer/sensor that is close to the shaft/gear under analysis. It is the case that a sensor may process 1 to m shaft(s), and each shaft may have 0, 1, or k gears.

For a shaft with no gear, the nominal tachometer signal is sufficient for fault analysis. Controlling for gear system dynamics is warranted for gear analysis on shafts that are "distant" from where the tachometer signal is collected, i.e., for those shafts on which the tachometer signal has been modified by the gear system transfer function.

The nominal tachometer signal is used to calculate the frequency of the shaft under analysis using the ratio from the shaft with the tachometer to shaft under analysis, while configuration meta data (e.g., the number of teeth on a gear for a known mesh), is used by the tachometer from vibration analysis to generate a local tachometer signal. The local tachometer signal is then used to calculate the TSA signal for the shaft.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for monitoring a rotating component in a gearbox comprising:
   a tachometer positioned to measure a rotation rate for a shaft of the gearbox;
   a sensor positioned to detect vibration signals emitted by the rotating component, wherein there is a shaft ratio from the shaft to the rotating component; and
   a microcontroller in electronic communication with the sensor and the tachometer, the microcontroller including a processor and a non-transitory memory, the processor configured to execute a set of instructions for accounting for gear system dynamics of the gearbox by:
      receiving vibration signal data from the sensor, wherein the vibration signal data includes data for the vibration signals emitted by the rotating component;
      receiving rotation rate data for the shaft from the tachometer;
      determining an expected rotation rate of the rotating component based on the rotation rate data for the shaft and the shaft ratio;
      determining an expected gear mesh frequency for the rotating component based on the expected rotation rate and a configuration of the rotating component;
      determining a variation in the rotation rate of the shaft and a variation in the expected rotation rate;
      generating a range of frequencies encompassing the expected gear mesh frequency based on the variation in the rotation rate of the shaft;
      applying a bandpass filter to the vibration signal data to isolate the range of frequencies;

deriving, from the filtered vibration signal data, an analytical signal representing a determined gear mesh frequency; and determining a derived rotation rate of the monitored rotating component based on the analytical signal.

2. The system of claim 1, wherein the rotating component is a gear.

3. The system of claim 1, wherein the rotating component is a shaft.

4. The system of claim 1, further including determining a transfer function of the gearbox.

5. A system for monitoring a rotating component in a gearbox comprising:

a tachometer positioned to measure a rotation rate for a shaft of the gearbox;

a sensor positioned to detect vibration signals emitted by the rotating component, wherein there is a shaft ratio from the shaft to the rotating component; and a microcontroller in electronic communication with the sensor and the tachometer, the microcontroller including a processor and a non-transitory memory, the processor configured to execute a set of instructions for generating a time synchronous average vibration signal (TSA) for the rotating component that accounts for gear system dynamics of the gearbox by:

receiving vibration signal data from the sensor, wherein the vibration signal data includes data for the vibration signals emitted by the rotating component;

receiving rotation rate data for the shaft from the tachometer;

determining an expected rotation rate of the rotating component based on the rotation rate data for the shaft and the shaft ratio;

determining an expected gear mesh frequency for the rotating component based on the expected rotation rate and a configuration of the rotating component;

determining a variation in the rotation rate of the shaft and a variation in the expected rotation rate;

generating a range of frequencies encompassing the expected gear mesh frequency based on the variation in the rotation rate of the shaft;

applying a bandpass filter to the vibration signal data to isolate the range of frequencies;

deriving, from the filtered vibration signal data, an analytical signal representing a determined gear mesh frequency;

determining a derived rotation rate of the monitored rotating component based on the analytical signal; and generating the TSA for the rotating component based on the vibration signal data and the derived rotation rate.

6. The system of claim 5, wherein the rotating component is a gear.

7. The system of claim 5, wherein the rotating component is a shaft.

8. The system of claim 5, further including determining a transfer function of the gearbox.

9. The system of claim 5, further including determining whether the rotating component exhibits indicators of a fault.

10. The system of claim 5, wherein the generating the TSA further includes:

determining a number of data points for the vibration signal data by multiplying a sample rate by a time of data acquisition;

finding a next largest radix-2 value for the number of data points;

taking a Fast Fourier Transform (FFT) of the vibration signal data;

determining, based on the expected gear mesh frequency and the variation in the expected rotation rate, a low bandwidth index and a high bandwidth index that encompass the expected gear mesh frequency;

zeroing the FFT from zero to the low bandwidth index and from the high bandwidth index to the radix-2 value; and taking an inverse FFT of the transformed, zeroed vibration signal data to generate the TSA.

11. A method for monitoring a rotating component in a gearbox comprising:

receiving vibration signal data from a sensor, wherein the sensor is positioned to detect vibration signals emitted by the rotating component in the gearbox and wherein the vibration signal data includes vibration signals emitted by the rotating component;

receiving rotation rate data for a shaft of the gearbox from a tachometer positioned to measure a rotation rate for the shaft, wherein there is a shaft ratio between the shaft and the rotating component;

determining an expected rotation rate of the rotating component based on the rotation rate data for the shaft and the shaft ratio;

determining an expected gear mesh frequency for the rotating component based on the expected rotation rate and a configuration of the rotating component;

determining a variation in the rotation rate of the shaft and a variation in the expected rotation rate;

generating a range of frequencies encompassing the expected gear mesh frequency based on the variation in the rotation rate of the shaft;

applying a bandpass filter to the vibration signal data to isolate the range of frequencies;

deriving, from the filtered vibration signal data, an analytical signal representing a determined gear mesh frequency; and determining a derived rotation rate of the rotating component based on the analytical signal.

12. The method of claim 11, wherein the rotating component is a gear.

13. The method of claim 11, wherein the rotating component is a shaft.

14. The method of claim 11, further including generating a time synchronous average vibration signal (TSA) for the rotating component based on the vibration signal data and the derived rotation rate.

15. The method of claim 14, wherein the generating the TSA further includes:

determining a number of data points for the vibration signal data by multiplying a sample rate by a time of data acquisition;

finding a next largest radix-2 value for the number of data points;

taking a Fast Fourier Transform (FFT) of the vibration signal data;

determining, based on the expected gear mesh frequency and the variation in the expected rotation rate, a low bandwidth index and a high bandwidth index that encompass the expected gear mesh frequency;

zeroing the FFT from zero to the low bandwidth index and from the high bandwidth index to the radix-2 value; and taking an inverse FFT of the transformed, zeroed vibration signal data to generate the TSA.

16. The method of claim 14, further including determining a transfer function of the gearbox.

17. The method of claim 14, further including determining whether the rotating component exhibits indicators of a fault.

\* \* \* \* \*